(No Model.) 3 Sheets—Sheet 2.

S. D. LOCKE.
HARVESTER RAKE.

No. 304,535. Patented Sept. 2, 1884.

WITNESSES
Wm A. Skinkle
Edwin A. Newman

INVENTOR
Sylvanus D. Locke
By his Attorneys
Rasmussen & Rasmussen (No Model.) 3 Sheets—Sheet 3.
S. D. LOCKE.
HARVESTER RAKE.
No. 304,535. Patented Sept. 2, 1884.
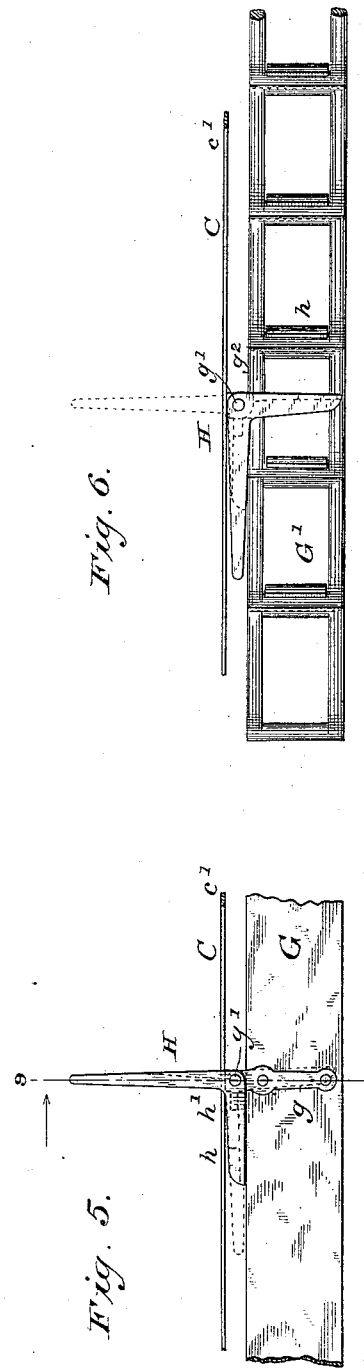
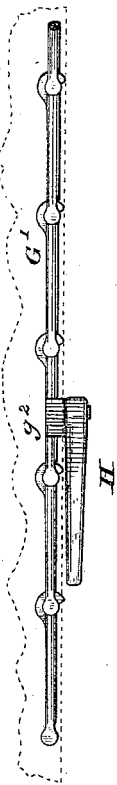
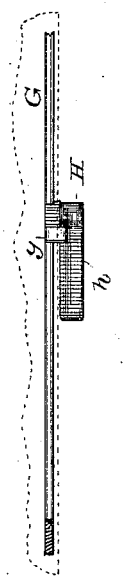
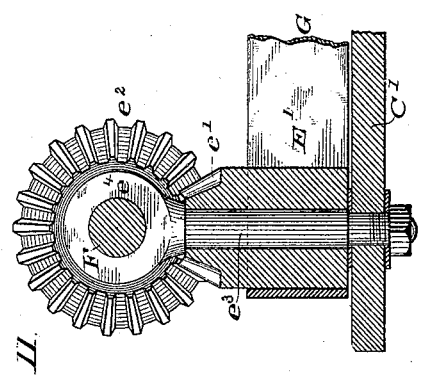
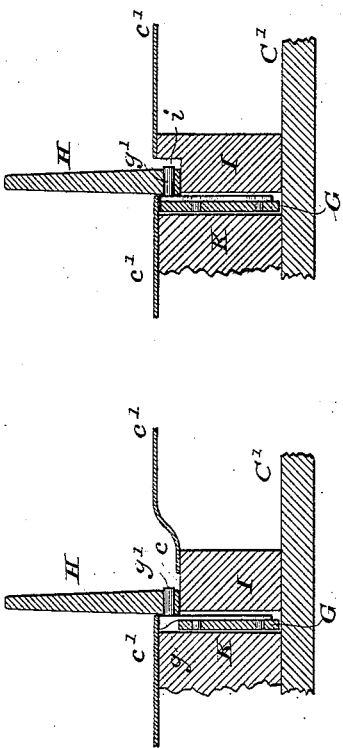
WITNESSES
Wm A. Skinkle
Edwin A. Newman.
INVENTOR
Sylvanus D. Locke,
By his Attorneys
Pancuisen & Pancuisen

UNITED STATES PATENT OFFICE.

SYLVANUS D. LOCKE, OF HOOSICK FALLS, NEW YORK.

HARVESTER-RAKE.

SPECIFICATION forming part of Letters Patent No. 304,535, dated September 2, 1884.

Application filed April 3, 1883. (No model.)

*To all whom it may concern:*

Be it known that I, SYLVANUS D. LOCKE, of Hoosick Falls, in the county of Rensselaer and State of New York, have invented certain new and useful Improvements in Harvester-Rakes, of which the following is a specification.

The invention relates to that class of rakes wherein teeth or fingers pivoted independently to and carried by endless belts or chains are caused to project through longitudinal slots in and sweep the upper surface of an apron or decking in their advance or raking movement, and to pass therebeneath, usually hinging or folding on the return. Heretofore said "belts," which term may be generally taken throughout the ensuing specification to include both bands and chains, have usually been mounted upon horizontal drums or rollers at the opposite ends of the raking-frame, and the teeth or fingers have been secured to them by a pivot parallel with the belt-surface, and have been sustained in their raking position by a heel-extension at practically right angles to the body, resting either upon the belt itself or following a rigid guide or track in the advancing movement, while permitting them to knuckle or fold in the return as soon as relieved from the resistance of the grain or control of the guide. Instead of thus arranging belts and raking teeth or fingers, I propose to locate at each end of the platform, beneath the apron or decking, a series of short vertical drums or rollers, and to mount narrow belts upon those with the plane of their surfaces vertical, each belt connecting a roll in one series with a directly-opposite roll in the other series, pivoting fingers or teeth to said belts by horizontal pivots, so that their flexions shall be in the plane of the surface, and guiding heel-extensions from said teeth by means of tracks immediately beneath the longitudinally-slotted apron, or upon said apron, as may be convenient; and my improvements relate to rakes of this latter type, as will hereinafter appear.

Figure 1:
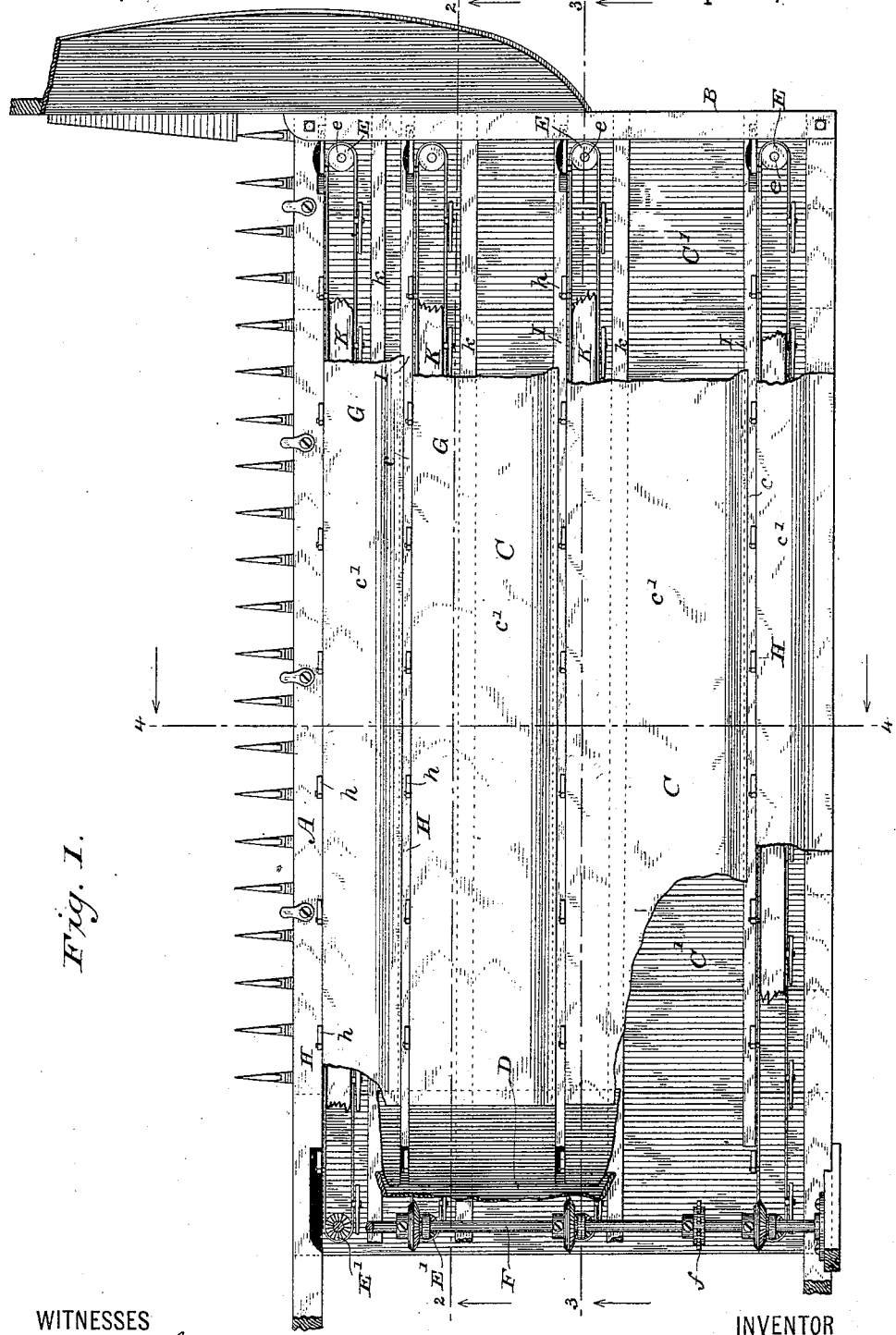
Figure 2:
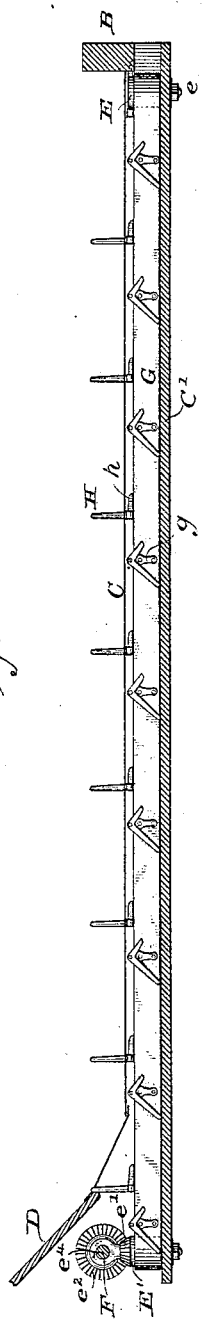
Figure 3:
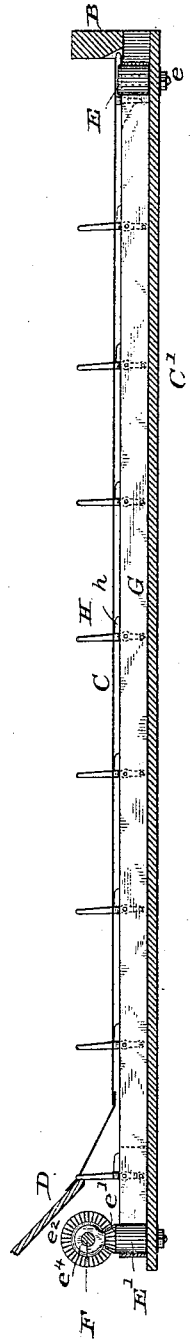
Figure 4:
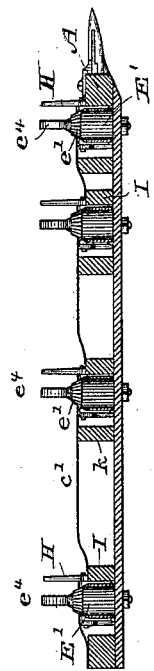

In the drawings, Figure 1 is a plan of a harvester-platform, with a portion of the apron broken away to expose more clearly the raking mechanism embodying my invention beneath; Fig. 2, a longitudinal section upon the correspondingly-numbered line in Fig. 1; Fig. 3, a like section as indicated in said Fig. 1; Fig. 4, a transverse section through the platform, showing the arrangement of driving-gear at the inner end; Figs. 5 and 7, side elevation and top plan view, in enlarged detail, of one of the raking-fingers attached to a leather of similar band; Figs. 6 and 8, like views of a finger attached to a chain belt; Fig. 9, a transverse section, enlarged, through decking, finger, belt, guide-ledge, and bottom boarding, showing the manner of attaching the finger to a narrow band; Fig. 10, a similar section to show the manner of attaching it to a broad band filling the space between decking and bottom boarding, and Fig. 11 a vertical transverse section through the driving-shaft and one of the driven rolls or drums.

A represents the longitudinal sills, and B one of the cross sills or girts—the one at the divider or grain end of the platform-frame.

C is the apron or decking, and C' the bottom boarding or planking of said frame. The decking in the present instance, as in the predecessor type above mentioned, will be preferably of sheet metal, having longitudinal slots $c$, to admit the passage of the raking-teeth.

D is a portion of an elevator-frame at the inner or stubble end of the platform, or may, according to the nature of the machine, be a slight rise or bridge at such end to allow for the actuating-gearing beneath.

Close to the cross piece or girt, at the divider end, are placed a series of upright rolls or drums, E, journaled on vertical spindles $e$, secured to and rising from the bottom planking, or from any appropriate bed-plate let into said planking; or they may be secured to an upper support, as the cross piece or girt above mentioned. Four rolls only are shown in the series; but it will be understood that any suitable number are to be employed. The two nearest the front sill or finger-bar are not far apart, those behind them being at increasing distances. The reason of this is that grain is usually heaviest at the butts, and therefore more liable to drag; also, that it is frequently short, sometimes so short that its heads will barely extend beyond the second roll. A single set of raking-fingers of type such as hereinbefore explained, or of that immediately hereinafter described, would simply twist and disarrange such stunted grain, and hence the second set must be brought so near alongside as to insure it two points of support. The further spacing alluded to has reference mainly to the proportion of labor to be exacted from each set.

A little distance beyond the foot of the elevator, and beneath the same, is a second series of rolls or drums, E', corresponding in arrangement and spacing with the first, the front roll of this series being directly opposite the front roll of the other, the second opposite the second, and so on. The rolls of the first set, however, being mere idlers or stretching-rolls, have plane tops, while the rolls of the second set, having the task of driving the rolling mechanism, are formed integral with, or receive as a rigid attachment to themselves at their upper ends, bevel-pinions $e'$, with which engage bevel gear-wheels $e^2$ upon a shaft, F, crossing the platform transversely underneath the elevator and supported in bearings at each end, and the upper ends of the spindles $e^3$, upon which these rolls are journaled, are held in position with reference to the shaft by collar bearings or yokes $e^4$, encircling said shaft. A sprocket-wheel, $f$, or other suitable means receives power from some other driven part of the harvester and transmits to the shaft, whereby as the latter is driven all the inner rolls will be caused to revolve. Each roll in a set is connected with its companion in the opposite set by a band, G, if the rolls are smooth-surfaced, or by a chain, G', if they have sprockets or other provisions for its reception. In case bands are employed, metallic clips or bracket-pieces $g$ are riveted to them at regular intervals, extending almost entirely across their breadth, so as to have a firm seat, and either projecting beyond their upper edges when the band is narrow, as seen in Fig. 9, to extend to and bear against the under surface of the metallic apron to prevent doubling of the belt under the resistance of the grain being raked, or stopping flush with such edge, when the band itself, as in Fig. 10, is of sufficient width to fill the space between apron and bottom boarding and be steadied between the two surfaces. At the upper end the clips have lateral offsets $g'$, forming pivot-pins for the angular raking-teeth H, which thus hinge or knuckle in a vertical plane parallel with the surface of the band. If, on the other hand, a chain should be preferred, then I adopt the construction indicated in Fig. 6, using detachable links and casting upon certain of these links a lug, $g^2$, which rises to the apron to brace the chain, as with the band, and serves as a base or support for the pivot-pin, or else said pin may project immediately from the upper longitudinal bar of the chain-link when the chain itself comes in contact with the under surface of the apron.

Parallel with and close to the outer surface of the belts on that side traveling toward the elevator are guide bars or ledges I, extending from the girt at the divider end until they reach a point just within the foot of the elevator. The upper surface of these is intended to form a track for the heel-extensions $h$ of the raking-teeth, so that as long as they are resting thereon their effective or tooth portion shall be vertical. To enable or cause the teeth to reach this position as the belt travels, the guide-bars are cut away opposite their corresponding drum at the divider end, to allow the teeth a passage as they are swung around said drum or roll by the movement of the belt, and then have an inclined guideway which is struck by each heel-extension and lifts it until it reaches the upper straight surface or track. At the inner end of the platform the guide-bars terminate immediately after or just at the time the teeth have reached the elevator-apron or commencement of the elevating-incline, causing them for lack of support to fall back upon their pivots, as indicated in Fig. 6, in which position they return beneath the apron to the divider end.

The front sill or finger-beam, in order to bring the raking-teeth close to the knife or sickle, is made the guide-ledge for the teeth or fingers of the adjacent belt, being for this purpose cut away at or near the drums at each end of the belt, the first recess being to raise the teeth to the track, and the second to cause them to fold or knuckle for their return. So long as the raking-teeth have a load upon them they will be held erect by the resistance during their passage along the guide-tracks; but should the platform be empty, owing to a momentary failure of crop, they tend to topple over forwardly and lie on said tracks out of raking position, with their heel-extensions or runners in the air. This is guarded against by a stop-pin or shoulder, $h'$, upon the ears or clips which support their pivots. Each tooth is flanged laterally along the base of its runner and fore part of the body, and when it is brought into effective position by the inclines at the divider end of its guide-bar the runner-flange strikes against the stop-pin and holds it steady, while when the tooth folds over at the elevator end of its traverse it is checked as soon as it reaches a horizontal position by the body-flange also coming against the same stop-pin.

Inside of each belt, extending from drum to drum, it is intended to place a bar, K, which serves as a backing or support to the plies of the belt, keeps the effective surface or ply in accurate alignment with the corresponding slot in the overlying apron and with the adjacent guide-bar, and also affords a line of attachment for the superposed edge of that section, $c'$, of the apron, commencing with the slot along said bar, and extending therefrom toward the rear of the harvester.

As the apron is longitudinally slotted, its decking must be in as many longitudinal strips or sections as there are belts, supposing, of course, the front belt to act in connection with the finger-bar as its track. The front edge of each section, as just intimated, overlies and is nailed to the filling-bar between the plies of the adjacent belt, and perhaps to another longitudinal bar or floor-strip, $k$, behind said belt. The rear edge reaches and is nailed to the guide-bar or trackway alongside the next belt. This bar may be low, as in Fig. 9, with the trackway along its surface, when the edge of the apron will be bent down to reach it, exposing one side of the tooth-runners; or it may rise flush with the other floor-strips, as in Fig. 10, retaining the apron-strip plane throughout, and receiving the runners or having the trackway therefor in a longitudinal gain, $i$, opposite the edge of the next rearward section.

I claim—

1. The combination, substantially as hereinbefore set forth, in a raking or conveying mechanism, of a belt mounted upon vertical rolls or drums, and driven in a constant direction, teeth or raking-fingers secured thereon by pivots perpendicular to its face, a guide-bar or trackway parallel with the advancing ply of the belt acting upon runners from said teeth, to lift the teeth to and retain them in a vertical position during the effective portion of said advance, and a supporting-bar filling the space between the two plies, and insuring the alignment of the belt with the trackway.

2. The combination, substantially as hereinbefore set forth, in a raking or conveying mechanism, of a belt mounted upon vertical rolls or drums, teeth or raking-fingers secured thereon by pivots perpendicular to its face, a suitable guide acting to raise and retain said teeth in a vertical position during the effective portion of their advance, a bottom boarding or flooring, with which the lower edge of the belt runs in contact, and an apron or decking overlying the upper edge thereof, and affording a bearing whereby said belt is prevented from doubling or buckling under strain.

3. The combination, substantially as hereinbefore set forth, in a raking or conveying mechanism, of a belt mounted upon vertical rolls or drums, clips or bracket-pieces secured to said belt and projecting above its face, lateral pivot-pins from said clips, teeth pivoted thereon to swing in a vertical plane parallel with the face of the belt, a suitable guide or trackway for heel extensions or runners on said teeth, and an apron overlying said belt, against the under surface of which the upper ends of the clips bear to prevent doubling or buckling of the belt.

4. The combination, substantially as hereinbefore set forth, in a raking or conveying mechanism, of a belt mounted upon vertical rolls or drums, teeth or fingers secured thereon by pivots perpendicular to its face, a guide-bar or trackway for heel extensions or runners from said teeth lying along the advancing ply of the belt, a supporting-bar filling the space between the two plies, and serving to keep the advancing side in alignment with the guide-bar, and an apron overlying the belt and affording a bearing to prevent, in connection with the supporting-bar, doubling or buckling of said belt.

5. The combination, substantially as hereinbefore set forth, with the front sill or finger-beam, of the belt mounted upon vertical drums at either end of the platform, with its advancing ply close to the rear face of said sill, the fingers pivoted to said belt in such manner as to swing in a vertical plane, the gains or recesses in said beam, and the trackway along its upper surface.

6. The combination, substantially as hereinbefore set forth, of the series of stretching drums or rollers along the divider end of the platform, the corresponding series of driving drums or rollers at the other end of the platform, independent belts connecting the drums of one series with opposite drums of the other series, teeth pivoted to said belts, and guides for said teeth, a driving-shaft supported in bearings at front and rear of the machine and passing over the driving series of rollers, collar-bearings from the spindle of said rollers receiving and steadied by the shaft, and bevel-wheels upon the shaft meshing with bevel-pinions on the upper end of each roller.

SYLVANUS D. LOCKE.

Witnesses:
WM. H. BATES,
WM. A. SKINKLE.